United States Patent Office 2,858,288
Patented Oct. 28, 1958

2,858,288

PREPARATION AND USE OF ACRYLONITRILE POLYMERS DISSOLVED IN AQUEOUS DIMETHYL SULFOXIDE

Forrest A. Ehlers, Walnut Creek, and Donald R. Tommela, Concord, Calif., assignors to The Dow Chemical Company, Midland, Mich., a corporation of Delaware No Drawing. Application December 13, 1956
Serial No. 627,976

9 Claims. (Cl. 260—29.6)

This invention relates to an improved method for the preparation of fiber-forming systems and of fibers and related shaped articles comprising polymers and copolymers of acrylonitrile.

Merely for convenient demonstrative purposes, the invention will hereinafter be described in particular association with fibers and fiber-forming systems although it has equivalent reference to the preparation of filaments, strands, yarns, tows, threads, cords and other funicular structures, ribbons, tapes, films, foils, sheets and the like which may be manufactured from and be comprised of polymers and copolymers of acrylonitrile.

A variety of techniques may be utilized for the preparation of polymers and copolymers of acrylonitrile and for the preparation of fiber-forming systems including, especially, spinning solutions with such polymeric materials. Likewise, various procedures are available for the preparation of fibers and the like which are comprised of polymers and copolymers of acrylonitrile (which are also often referred to as acrylic fibers) with the employment of such fiber-forming systems.

It is a common and frequent practice, for example, to prepare polymers and copolymers of acrylonitrile in separate polymerization systems from which the product polymeric materials must be recovered for subsequent incorporation in fiber-forming systems that are employed for spinning into acrylic fibers. The endemic disadvantages in this manner of practice are apparent in the devious and complex multiple-operation manufacturing requirements which it involves.

The inconvenience and inefficiency of duplex manufacturing procedures in the preparation and spinning of acrylic fiber-forming systems may be precluded by directly polymerizing the polymers and copolymers of acrylonitrile in the same medium that comprises the dispersant vehicle for the polymeric material in the fiber-forming system. Advantage of the direct modus is frequently taken in acrylic fiber manufacturing operations. However, difficulties may also be encountered in its employment. Thus, it may be difficult to accurately control the molecular weight of the polymeric product that may be obtained. In addition, it may sometimes result in the preparation of fibers having one or more of their several properties inferior in comparison with desirable and frequently acceptable criteria. Furthermore, a large proportion of the relatively few ubiquitous mediums that are adaptable for diplastic function as polymerization and dispersant vehicles in the preparation and spinning of acrylic fiber-forming systems may be afflicted with peculiar detrimentalities that may render their employment undesirable or not as completely advantageous as might be wished for.

Among the more significantly discutable of these may be included an unsatisfactory faculty of the medium, in its dual capacity as a polymerization medium, to promote or permit suitably high yields of the polymeric product or, as has been mentioned, to permit the product to be consistently obtained readily in a desirable molecular weight range. Neither may it always provide the most desirable type of fiber-forming system for optimum spinning performance. The cost of the medium may also provide deuteroscopic hindrance to its commercial application. In other instances, a particular medium may be objectionable because of its difficult handling characteristics due to fugacity, toxicity, corrodent propensities and the like. Or it may not be satisfactorily susceptible to being recovered in an efficient manner or may have an ineptitude for reemployment after recovery, or both. Furthermore, some such media may necessitate and involve extraordinary manufacturing requirements and ancillary apparatus such as considerable amounts of refrigeration for maintaining low temperatures during various processing stages.

It would be advantageous to provide an improved method for the preparation of fiber-forming systems and of fibers and related shaped articles therefrom comprising polymers and copolymers of acrylonitrile in which polymerization to a satisfactory product in a desirable molecular weight range and subsequent excellent spinning performance is efficiently and directly accomplished in and with the same solvent substance. It would also be advantageous for such a method to be available in which an eminently suitable solvent substance could be utilized in a generally satisfactory and facile manner as the ubiquitous polymerization medium and spinning solution vehicle. The realization of these and other advantages and benefits is among the principal objects of the present invention.

To this end, improved fiber-forming systems may be prepared and afforded by a method in accordance with the present invention which comprises polymerizing a monomeric solution of acrylonitrile or a mixture of acrylonitrile and another monoethylenically unsaturated monomeric material in a solvent which is essentially comprised of aqueous dimethyl sulfoxide, $(CH_3)_2SO$, to directly provide a spinning solution of polyacrylonitrile or a copolymer of acrylonitrile in the solvent. Advantageously, the solvent substance is comprised essentially of an aqueous solution of dimethyl sulfoxide that contains up to about 20 percent by weight of water. Beneficially from about 2 to 15 percent by weight of water may be contained in the aqueous solvent. The proportion of water that is present in the solvent regulates and controls to a great extent the molecular weight of the polymeric product that may be obtained. Usually, the presence of water serves to increase the molecular weight of the polymeric product over what may be achieved when the polymerization is effected in the pure organic solvent. Generally, the polymerization may be facilitated by employment of a suitable catalyst or catalytic influence. The spinning solutions that may be obtained by the method of the invention are clear, viscous, readily spinnable compositions which contain the product polymeric material in an optimum form and condition for the preparation of strong, durable and generally satisfactory acrylic fibers and related shaped articles.

The fibers and other shaped articles may be obtained in a known manner by extruding or spinning the fiber-forming systems of the invention through suitable spinnerettes, jets, dies or equivalent extrusion devices into a suitable coagulating liquid for the spinning solution such as aqueous or glycol baths and the like which may be maintained so as to have a predetermined and desired content of the solvent dimethyl sulfoxide in its composition. The presence of the water in the fiber-forming system generally improves its spinning performance, especially when certain aqueous coagulating liquids are employed, due to its beneficial effect on the initial settingup or coagulation rate of the freshly extruded product. After extrusion, the freshly spun fibers may be treated and handled in any desirable and suitable manner according to conventional or particularly devised techniques which are adapted for the processing and finishing of various acrylic fibers. They may be formed into and subsequently handled as tow bundles or may be treated as individual filaments or relatively small multifilamentous bundles or strands. They may be stretched to attain a desired orientation according to various techniques, washed, cut into staple lengths, and dried in any desired and propitious sequence or they may be prepared as continuous filament yarns in endless, uninterrupted lengths which, optically, may be twisted into threads or cords before collection as a finished product. Of course, various lubricants and other beneficial treating agents may advantageously be employed on the fibers during the manufacturing operations. In addition, in certain instances, casting techniques may be utilized for formation of the shaped articles, particularly when films and sheets are being prepared.

Advantageously, acrylonitrile is polymerized in the aqueous dimethyl sulfoxide solvent in order to directly prepare a polyacrylonitrile spinning solution. However, as indicated, acrylonitrile-containing mixtures with other desired monomeric materials which are soluble in aqueous dimethyl sulfoxide, particularly mixtures containing predominant proportions of acrylonitrile, may also be polymerized directly in the solvent to prepare desired copolymeric spinning solutions provided the copolymer product is soluble in the water-containing dimethyl sulfoxide. It is especially advantageous to employ a sufficiency of acrylonitrile in a given monomeric mixture to insure that the copolymeric product contains at least about 80 percent by weight of acrylonitrile polymerized in the polymer molecule. Other monomeric materials which may be employed advantageously with acrylonitrile in the practice of the present invention include allyl alcohol, vinyl acetate, acrylamide, methacrylamide, methyl acrylate, 2-vinyl pyridone, dimethylaminoethylacrylate, methacrylonitrile, acrylic acid, itaconic acid, vinyl acetic acid, ethyl acrylate, fumaronitrile, 2-vinyl 5-ethyl pyridine, ethylene sulfonic acid and its alkali metal salts, allyl sulfonic acid and its alkali metal salts, vinyl lactams such as vinyl caprolactam and vinyl piperidone, vinyl benzene sulfonic acid and its salts, vinylbenzene-trimethyl ammonium chloride, vinylmethyl ether, N-acryloyl taurine and its salts, 2-amino-ethyl-methacrylate hydrochloride, 2-sulfoethylacrylate, X-sulfopropylacrylate, maleic anhydride and the like, including mixtures thereof.

It is usually advantageous to polymerize the monomeric materials when they are dissolved in the aqueous dimethyl sulfoxide in an amount between about 5 and 25 percent by weight, based on the total weight of the monomeric solution. The optimum concentration of dissolved monomer for employment in specific instances may vary with such factors as the molecular weight which is desired to be obtained in the polymerized product, the concomitant viscosity that is desired to be achieved in the directly formed spinning solution and the extrusion or spinning conditions, including the spinning temperature and the temperature and constitution of the coagulation system, that are to be employed in the preparation of extruded products from the prepared fiber-forming system.

In preparing the fiber-forming systems, the polymerization may be frequently facilitated by use of a suitable catalyst material. Catalysts which may be employed with advantage in the practice of the invention include such free radical generating catalytic assistants as azobisisobutyronitrile, ammonium persulfate, potassium persulfate and the like and such catalyzing means as actinic radiation with ultraviolet light. The catalysts may be employed in a conventional manner and quantity as will be apparent that those skilled in the art. When catalyst materials are employed it is relatively inconsequential whether the monomeric material to be polymerized or the catalyst is first incorporated in the solvent.

The dissolved monomeric material may be polymerized at any temperature at which the aqueous dimethyl sulfoxide solvent is in the liquid state. Thus, fiber-forming systems may be prepared in accordance with the method of the invention by conducting the polymerization at a temperature as low as about 20° C. or at elevated temperatures. Care should be taken to avoid higher temperatures which may degrade or decompose any of the ingredients of the fiber-forming systems either during or after their preparation. The polymerization is usually continued until a suitable polymeric product has been obtained. The period of time in which this may be effected depends, as is apparent, upon all of the conditions of the polymerization including monomer concentration in the solvent and the amount and type of catalyst employed as well as the temperature which is utilized. Ordinarily, the polymerization may be terminated with formation of a suitable fiber-forming system containing the polymeric product in a satisfactory desired molecular weight range in a time period which rarely exceeds 64 hours and often may be as short as about 12 hours or less.

Advantageously, the fiber-forming systems may be prepared by polymerizing the dissolved monomeric material with catalytic assistance under atmospheric pressure at a temperature between about 25 and 100° C. for a period of time which is between about 16 and 40 hours. Any suitable equipment may be employed for the polymerization although it is beneficial to employ apparatus that is equipped with an efficient means for agitation. Spinning of the fiber-forming systems may be accomplished at any desired temperature at which the polymeric product remains in solution and which may be employed most favorably with the particular coagulating system being utilized for the particular products being manufactured. For example, fiber-forming systems in accordance with the invention containing about 10–15 percent by weight of dissolved polymeric solids may advantageously be spun into fine fiber products in aqueous coagulating liquids when they are maintained at a temperature between about 25° and 60° C. with the coagulating liquid at about the same or at a lower temperature.

The invention is further illustrated in and by the following examples in which, unless otherwise indicated, all parts and percentages are to be taken by weight.

EXAMPLE I

A fiber-forming system was prepared by dissolving about 12.0 parts of acrylonitrile and 0.12 part of azobisisobutyronitrile in a mixture of about 82.5 parts of dimethyl sulfoxide and 5.25 parts of water and polymerizing for about 90 hours at a temperature of about 50° C. About 85.4 percent of the monomer was converted to polyacrylonitrile to form a clear spinning solution which contained about 10.25 percent dissolved polymer solids which had an average molecular weight of about 64,000. The viscosity of the spinning solution at about 50° C. was 150 poises. The spinning solution was formed into 4.5 denier filaments with a 60 hole platinum spinnerette having individual jet diameters of about 0.003 inches using an aqueous coagulating liquid. The spinning solution, at a temperature of about 50° C., was extruded through the spinnerette into the coagulating liquid at a temperature of about 25° C. with about 35 inches of travel in the bath before withdrawal therefrom. The resulting fibers were washed thoroughly in water and oriented by being stretched in steam before being dried at 150° C. The finished 3.3 denier fibers had a tenacity of about 2.1 grams per denier, a dry yield value of about 1.03 grams per denier and an elongation of about 34 percent. The Young's modulus value of the finished fibers was about 49.

EXAMPLE II

In a triseriate procedure, designated in the following tabulation as runs A1 through A10 and B1 through B4, about 24 parts of acrylonitrile, 0.24 part of catalyst, and 175.5 parts of a solvent consisting of dimethyl sulfoxide containing from 0 to 8 percent water were charged to suitable polymerization apparatus consisting of an autoclave equipped with a mixer in which, at a temperature of about 50° C., polyacrylonitrile was formed to directly provide clear, viscous, gel-free spinning solutions. The proportions of the ingredients which were employed and other pertinent data are included in the following Table I. Azobisisobutyronitrile was employed as the catalyst in runs A1 through A10 while ammonium persulfate was utilized for catalysts in the "B" runs. The ammonium persulfate was not completely dissolved in either of the runs B1 and B2 but was more soluble when water was present in the solvent.

*Table I.—Polymerization of acrylonitrile in dimethyl sulfoxide and aqueous dimethyl sulfoxide solvents using various catalysts*

| Run No. | Percent H₂O in Solvent | Polymerized Hrs. at 50° C. | Viscosity, poise at 50° | Percent Solids | Percent Conv. | Molecular Weight |
|---|---|---|---|---|---|---|
| A1 | 0 | 90 | 125 | 10.90 | 90.8 | 41,200 |
| A2 | 4 | 90 | 115 | 10.95 | 91.3 | 46,600 |
| A3 | 6 | 90 | 150 | 10.85 | 90.5 | 48,400 |
| A4 | 8 | 90 | >2,500 | 11.10 | 92.4 | 53,700 |
| A5 | 0 | 4 | (a) | 1.25 | 9.4 | (b) |
| A6 | 0 | 6 | (a) | 2.24 | 18.7 | (b) |
| A7 | 0 | 16 | (a) | 7.88 | 65.6 | 77,500 |
| A8 | 6 | 4 | (a) | 1.56 | 13.0 | (b) |
| A9 | 6 | 6 | (a) | 3.96 | 33.0 | 106,500 |
| A10 | 6 | 16 | (a) | 5.30 | 44.2 | 76,000 |
| B1 | 0 | 20 | 80 | 9.57 | 79.7 | 89,200 |
| B2 | 4 | 20 | 600 | | | 110,000 |

ªViscosity not observed.
ᵇInsufficient polymer obtained to determine molecular weight.

In a similar manner, other catalyst materials including benzoyl peroxide, dichlorobenzoyl peroxide, lauroyl peroxide, cumene peroxide and the like may be employed with good results, analogous to those achieved with azobisisobutyronitrile, in the polymerization.

In a like manner, results which are equivalent to the above may be obtained according to the foregoing general procedure when mixtures containing predominant proportions of acrylonitrile with such monomeric materials as 2-sulfoethylacrylate, ethylene sulfonic acid, vinyl acetate, methyl acrylate, 2-vinyl pyridine, dimethylaminoethylacrylate, methacrylonitrile, methyl acrylamide, acrylic acid and ethyl acrylate are dissolved in aqueous dimethyl sulfoxide solvents and polymerized to spinnable copolymeric solutions therein.

As is apparent, the present invention provides an improved and highly advantageous method for the preparation of spinnable, dissolved, fiber-forming systems to facilitate the manufacture of fibers and similar shaped articles prepared from polymers having controlled high molecular weights in a simple, forthright, expedient and economic manner. It completely eliminates the necessity for the tedious separate preparation of the spinnable polymers and copolymers for subsequent utilization and incorporation in a fiber-forming composition while allowing for an accurate control of their molecular weight. It also eliminates the frequently painstaking and complex task of incorporating such separately prepared polymeric substances in spinnable compositions.

Certain changes and modifications in the practice of the present invention can be readily entered into without substantially departing from its intended spirit and scope. Therefore, it is to be fully comprehended that the invention is not to be considered as being limited or in any way restricted to or by the preferred didactic embodiments thereof which are included in the foregoing description and specification. Rather, it is to be interpreted and construed in the light of what is set forth and defined in the hereto appended claims.

What is claimed is:

1. Method for preparing spinnable, dissolved fiber-forming systems which comprises dissolving a monoethylenically unsaturated, acrylonitrile-containing monomeric material in an aqueous dimethyl sulfoxide solvent that contains between about 2 and 20 weight percent of water, based on the weight of the solvent, said monoethylenically unsaturated monomeric material comprising acrylonitrile which is employed in a sufficient quantity to obtain a resulting dissolved polymeric product which contains in the polymer molecule at least about 80 percent by weight of acrylonitrile, any balance of said monomeric material being another ethylenically unsaturated monomeric material that is copolymerizable with acrylonitrile; then carrying out the polymerization of the dissolved monomeric material in the aqueous dimethyl sulfoxide at a temperature between about 20° C. and 100° C. to form a fiber-forming polymeric product containing acrylonitrile polymerized in the polymer molecule in spinnable solution in said aqueous dimethyl sulfoxide.

2. The method of claim 1, wherein the aqueous dimethyl sulfoxide solvent contains between about 2 and 15 percent by weight of water.

3. The method of claim 1, wherein the monoethylenically unsaturated monomeric material is entirely acrylonitrile.

4. The method of claim 1, wherein the amount of the monoethylenically unsaturated monomeric material which is employed is an amount between about 5 and 25 percent by weight based on the total weight of the solution of the dissolved monomeric material in the aqueous dimethyl sulfoxide.

5. A method in accordance with the method set forth in claim 1, wherein azobisisobutyronitrile is used as a polymerization catalyst.

6. A method in accordance with the method set forth in claim 1, wherein a persulfate is used as a polymerization catalyst.

7. A method in accordance with the method set forth in claim 1, wherein polymerization is accelerated by means of actinic radiation.

8. Method for the preparation of fibers and related shaped articles which comprises dissolving a monoethylenically unsaturated, acrylonitrile-containing monomeric material in an amount between about 5 and 25 percent by weight, based on the weight of the solution, in an aqueous dimethyl sulfoxide solvent that contains between about 2 and 20 weight percent of water, based on the weight of the solvent, said monoethylenically unsaturated monomeric material comprising acrylonitrile which is employed in a sufficient quantity to obtain a resulting dissolved polymeric product which contains in the polymer molecule at least about 80 percent by weight of acrylonitrile, any balance of said monomeric material being another ethylenically unsaturated monomeric material that is copolymerizable with acrylonitrile, carrying out the polymerization of the dissolved monomeric material in the aqueous dimethyl sulfoxide at a temperature between about 25° C. and 100° C. to form a fiber-forming polymeric product containing acrylonitrile polymerized in the polymer molecule in a spinnable solution in said aqueous dimethyl sulfoxide solvent; spinning said spinnable solution into fibers in a coagulating liquid therefor.

9. The method of claim 8, wherein the aqueous dimethyl sulfoxide solvent contains between about 2 and 15 percent by weight of water.

References Cited in the file of this patent

UNITED STATES PATENTS

| | | |
|---|---|---|
| 2,404,717 | Houtz | July 23, 1946 |
| 2,528,710 | Richards | Nov. 7, 1950 |
| 2,682,518 | Caldwell | June 29, 1954 |
| 2,734,041 | Jones et al. | Feb. 7, 1956 |
| 2,768,148 | Schildknecht et al. | Oct. 23, 1956 |